United States Patent
Miki (10) Patent No.: US 11,031,623 B2
(45) Date of Patent: Jun. 8, 2021

(54) FLUORIDE ION BATTERY HAVING CATHOD ACTIVE MATERIAL LAYER AND ANODE ACTIVE MATERIAL LAYER GENERATED VIA SELF-FORMING REACTION OF SOLID ELECTROLYTE LAYER

(71) Applicant: TOYOTA JIDOSHA KABUSHIKI KAISHA, Toyota (JP)

(72) Inventor: Hidenori Miki, Hiratsuka (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 53 days.

(21) Appl. No.: 16/388,268

(22) Filed: Apr. 18, 2019

(65) Prior Publication Data

US 2019/0334202 A1 Oct. 31, 2019

(30) Foreign Application Priority Data

Apr. 27, 2018 (JP) .............................. JP2018-086509

(51) Int. Cl.
*H01M 6/04* (2006.01)
*H01M 10/0562* (2010.01)
(Continued)

(52) U.S. Cl.
CPC ......... *H01M 10/0562* (2013.01); *C01B 32/05* (2017.08); *H01M 4/0445* (2013.01);
(Continued)

(58) Field of Classification Search
CPC ......... H01M 10/0561; H01M 10/0562; H01M 10/056; H01M 10/0567; H01M 10/0568;
(Continued)

(56) References Cited

FOREIGN PATENT DOCUMENTS

JP 2013-145758 A 7/2013
JP 2014-86226 A 5/2014
(Continued)

OTHER PUBLICATIONS

F. Gschwind et al., "Fluoride ion batteries: Theoretical performance, safety, toxicity, and a combinatorial screening of new electrodes", Journal of Fluorine Chemistry, 2016, vol. 182, pp. 76-90 (15 pages total).

*Primary Examiner* — Raymond Alejandro
(74) *Attorney, Agent, or Firm* — Sughrue Mion, PLLC (57) ABSTRACT

A fluoride ion battery in which occurrence of short circuit is inhibited by providing a fluoride ion battery including: an electrode layer that includes a first metal element or a carbon element and is capable of fluorination and defluorination; a solid electrolyte layer containing a solid electrolyte including a second metal element with lower fluorination potential and defluorination potential than those of the first metal element or of the carbon element; and an anode current collector, in this order; and an anode active material layer is not present between the solid electrolyte layer and the anode current collector; and the solid electrolyte layer comprises: on the anode current collector side surface, a short circuit inhibiting part containing the solid electrolyte; a Ce compound containing a Ce element, a S element, and a F element; and an electron conductive material.

4 Claims, 5 Drawing Sheets

(51) Int. Cl.
  *C01B 32/05* (2017.01)
  *H01M 10/0567* (2010.01)
  *H01M 10/0568* (2010.01)
  *H01M 4/583* (2010.01)
  *H01M 4/66* (2006.01)
  *H01M 4/04* (2006.01)
  *H01M 4/133* (2010.01)
  *H01M 4/38* (2006.01)

(52) U.S. Cl.
  CPC ............ *H01M 4/133* (2013.01); *H01M 4/38* (2013.01); *H01M 4/5835* (2013.01); *H01M 4/66* (2013.01); *H01M 10/0567* (2013.01); *H01M 10/0568* (2013.01); *H01M 2300/0065* (2013.01)

(58) Field of Classification Search
  CPC ...... H01M 10/39; H01M 10/38; H01M 10/36; H01M 4/0445; H01M 4/0447; H01M 4/044; H01M 4/0438; H01M 4/133; H01M 4/38; H01M 4/388; H01M 4/5835; H01M 4/583; H01M 4/58; H01M 4/66; H01M 4/665; H01M 2300/0065; H01M 2300/0068; H01M 2300/008
  See application file for complete search history.

(56) References Cited

FOREIGN PATENT DOCUMENTS

| | | | | |
|---|---|---|---|---|
| JP | 2016-524803 A | 8/2016 | | |
| WO | 2007/146453 A1 | 12/2007 | | |
| WO | WO 2007/146453 | * 12/2007 | ............ | C01B 31/00 |
| WO | 2014/201568 A1 | 12/2014 | | |

* cited by examiner

FLUORIDE ION BATTERY HAVING CATHOD ACTIVE MATERIAL LAYER AND ANODE ACTIVE MATERIAL LAYER GENERATED VIA SELF-FORMING REACTION OF SOLID ELECTROLYTE LAYER

TECHNICAL FIELD

The present disclosure relates to a fluoride ion battery.

BACKGROUND ART

As high-voltage and high-energy density batteries, for example, Li ion batteries are known. The Li ion battery is a cation-based battery utilizing a Li ion as a carrier. Meanwhile, as anion-based batteries, fluoride ion batteries utilizing a fluoride ion as a carrier are known. For example, Patent Literature 1 discloses an electrochemical cell (fluoride ion battery) provided with a cathode, an anode, and an electrolyte capable of conducting an anion charge carrier (F).

CITATION LIST

Patent Literature

Patent Literature 1: Japanese Patent Application Laid-Open (JP-A) No. 2013-145758

SUMMARY OF DISCLOSURE

Technical Problem

In a general fluoride ion battery, five kinds of members: a cathode current collector, a cathode active material layer, an electrolyte layer, an anode active material layer, and an anode current collector, are used. Meanwhile, based on the viewpoint of cost reduction of a battery for example, a battery having a simple structure is preferable. In view of this point, the inventor of the present application has thoroughly researched and obtained the knowledge that the power generation element of a battery (a cathode active material layer, a solid electrolyte, an anode active material layer) can be formed with two kinds of members: an electrode layer and a solid electrolyte layer. In specific, he has obtained the knowledge it is possible to obtain a fluoride ion battery in which an anode active material layer is generated in a self-forming manner from the solid electrolyte layer. Meanwhile, short circuit tends to occur in a fluoride ion battery having such a structure.

The present disclosure has been made in view of the above circumstances, and a main object thereof is to provide a fluoride ion battery in which occurrence of short circuit is inhibited.

Solution to Problem

The present disclosure provides a fluoride ion battery comprising: an electrode layer that includes a first metal element or a carbon element and is capable of fluorination and defluorination; a solid electrolyte layer containing a solid electrolyte including a second metal element with lower fluorination potential and defluorination potential than those of the first metal element or of the carbon element; and an anode current collector, in this order; and an anode active material layer is not present between the solid electrolyte layer and the anode current collector; and the solid electrolyte layer comprises: on the anode current collector side surface, a short circuit inhibiting part containing the solid electrolyte; a Ce compound containing a Ce element, a S element, and a F element; and an electron conductive material.

According to the present disclosure, a specific short circuit inhibiting part is arranged so as to obtain a fluoride ion battery in which occurrence of short circuit is inhibited.

In the present disclosure, the anode current collector may be directly disposed on a surface of the short circuit inhibiting part.

The present disclosure also provides a fluoride ion battery comprising: an electrode layer that includes a first metal element or a carbon element and is capable of fluorination and defluorination; a solid electrolyte layer containing a solid electrolyte including a second metal element with lower fluorination potential and defluorination potential than those of the first metal element or of the carbon element; and an anode current collector, in this order; and a cathode active material layer containing a fluoride of the first metal element or the carbon element is present on the anode current collector side surface of the electrode layer; and an anode active material layer containing: a Ce compound containing a simple substance of the second metal element, a Ce element, a S element and a F element; and an electron conductive material, is present on the anode current collector side surface of the solid electrolyte layer.

According to the present disclosure, a specific anode active material layer is present so as to obtain a fluoride ion battery in which occurrence of short circuit is inhibited.

In the present disclosure, the first metal element may be at least one kind of Pb, Cu, Sn, In, Bi, Sb, Ni, Co, La, Ce, Mn, V, Fe, Cr, Nb, Ti, and Zn.

In the present disclosure, the second metal element may be at least one kind of La, Ba, Pb, Sn, Ca, and Ce.

In the present disclosure, the solid electrolyte may be at least one kind of $La_{1-x}Ba_xF_{3-x}$ (0≤x≤2), $Pb_{2-x}Sn_xF_4$ (0≤x≤2), $Ca_{2-x}Ba_xF_4$ (0≤x≤2), and $Ce_{1-x}Ba_xF_{3-x}$ (0≤x≤2).

Advantageous Effects of Disclosure

The present disclosure exhibits effects such that a fluoride ion battery in which occurrence of short circuit is inhibited can be obtained.

DESCRIPTION OF EMBODIMENTS

The fluoride ion battery in the present disclosure will be hereinafter described in detail.

Figure 1A:
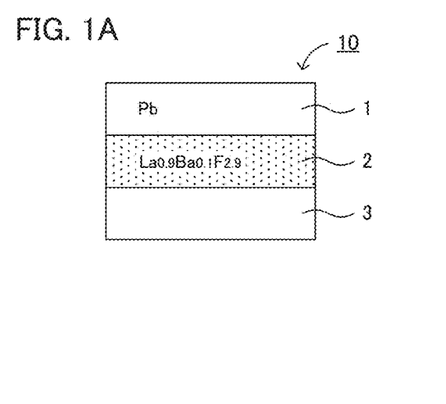
FIGS. 1A and 1B are schematic cross-sectional views exemplifying a fluoride ion battery in which an anode active material layer is generated in a self-forming manner from a solid electrolyte layer.
Figure 1B:
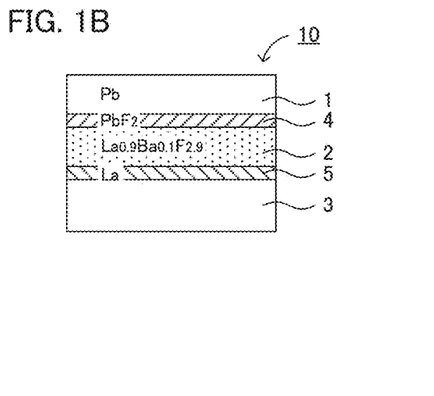

FIGS. 1A and 1B are schematic cross-sectional views exemplifying a fluoride ion battery in which an anode active material layer is generated in a self-forming manner from a solid electrolyte layer; FIG. 1A shows the state before charge, and FIG. 1B shows the state after charge. Fluoride ion battery 10 shown in FIGS. 1A and 1B is respectively provided with electrode layer 1 that includes a first metal element or a carbon element and is capable of fluorination and defluorination, solid electrolyte layer 2 containing a solid electrolyte including a second metal element with lower fluorination potential and defluorination potential than those of the first metal element or of the carbon element, and anode current collector 3, in this order in a thickness direction.

Fluoride ion battery 10 shown in FIG. 1A does not have an anode active material layer between solid electrolyte layer 2 and anode current collector 3. In FIG. 1A, electrode layer 1 is directly disposed on one surface of solid electrolyte layer 2, and anode current collector 3 is directly disposed on the other surface of solid electrolyte layer 2. Here, the case when electrode layer 1 is a Pb foil, and solid electrolyte layer 2 contains $La_{0.9}Ba_{0.1}F_{2.9}$ (solid electrolyte) is considered. When fluoride ion battery 10 shown in FIG. 1A is charged, the fluorination reaction of electrode layer 1 (Pb foil) occurs in the interface between electrode layer 1 and solid electrolyte layer 2, and thereby $PbF_2$ is obtained. The $PbF_2$ corresponds to cathode active material layer 4 in a charged state. Incidentally, electrode layer 1 (Pb foil) not in reaction with a fluoride ion functions as a cathode current collector.

Meanwhile, in the interface between solid electrolyte layer 2 and anode current collector 3, defluorination reaction of solid electrolyte layer 2 ($La_{0.9}Ba_{0.1}F_{2.9}$) occurs and thereby a simple substance of La is generated ($La_{0.9}Ba_{0.1}F_{2.9} + 2.7\ e^- \rightarrow 0.9\ La + 0.1\ BaF_2 + 2.7\ F^-$). The simple substance of La corresponds to a simple substance of the second metal element, and a layer containing a simple substance of La corresponds to anode active material layer 5. In other words, anode active material layer 5 is generated in a self-forming manner from solid electrolyte layer 2. In this manner, the power generating element of a battery (a cathode active material layer, a solid electrolyte layer, an anode active material layer) can be fabricated with two kinds of members: for example, a Pb foil and $La_{0.9}Ba_{0.1}F_{2.9}$.

It means that, by charging fluoride ion battery 10 shown in FIG. 1A, as shown in FIG. 1B, fluoride ion battery 10 comprising cathode active material layer 4 containing a fluoride of a first metal element or a carbon element on anode current collector 3 side surface of electrode layer 1, and anode active material layer 5 containing a simple substance of a second metal element on anode current collector 3 side surface of solid electrolyte layer 2, can be obtained.

In this manner, with two kinds of members: a specific electrode layer and solid electrolyte layer, the power generating element of a battery can be formed in the fluoride ion battery. The cost reduction of a battery can be achieved by reducing the kind of members to be used in the battery. Also, the electrode layer has the functions of both a current collector and a cathode active material layer. Accordingly, it is unnecessary to use a cathode current collector as an additional member, and thus the high energy densification of the battery may be easily achieved.

Also, the power generating element of a battery (a cathode active material layer, a solid electrolyte layer, an anode active material layer) can be fabricated by just the combination of an electrode layer and a solid electrolyte layer that can be an anode active material layer in a self-forming manner. Such a reaction mechanism is peculiar to a fluoride ion all solid state battery (a fluoride ion battery including a solid electrolyte layer), which is the reaction mechanism not conventionally known.

Figure 2A:
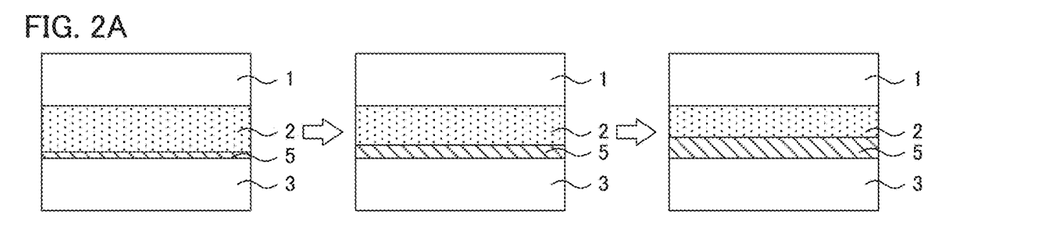
FIGS. 2A and 2B are schematic cross-sectional views explaining a presumed mechanism of occurrence of short circuit.
Figure 2B:
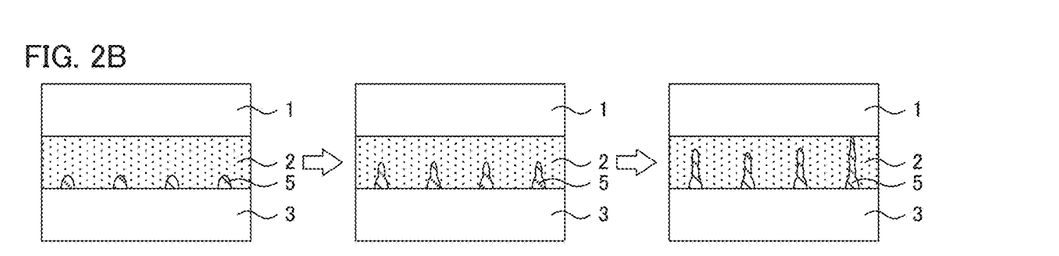

Meanwhile, short circuit tends to occur in fluoride ion battery 10 exemplified in FIGS. 1A and 1B. The presumed mechanism thereof will be explained with reference to FIGS. 2A and 2B. Incidentally, in FIGS. 2A and 2B, the description of cathode active material layer 4 is omitted as a matter of convenience. Here, as shown in FIG. 2A, when anode active material layer 5 is ideally generated from solid electrolyte layer 2, the thickness of anode active material layer 5 uniformly increases as the charge proceeds. However, in reality, the self-forming reaction of anode active material layer 5 locally proceeds. In other words, defluorination reaction ununiformly proceeds. In specific, as shown in FIG. 2B, anode active material layer 5 is locally generated. Since anode active material layer 5 includes a simple substance of the second metal element of which electron conductivity is extremely high, the surface of this simple substance of the metal becomes an active site of the next defluorination reaction on a priority basis. The reason why it becomes the active site is because the point where the conducting path of fluoride ion is the shortest is the surface of the simple substance of the metal. When this reaction occurs repeatedly, anode active material layer 5 is deposited in dendrite shape as the charge proceeds, which results in short circuit. Short circuit presumably occurs in such a mechanism.

Figure 3A:
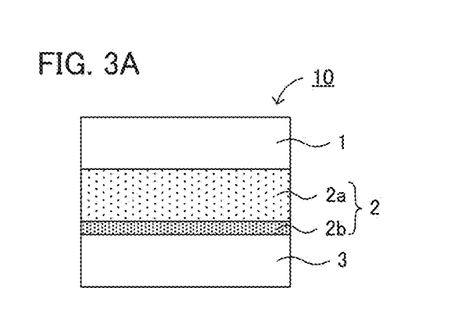
FIGS. 3A and 3B are schematic cross-sectional views exemplifying the fluoride ion battery in the present disclosure.
Figure 3B:
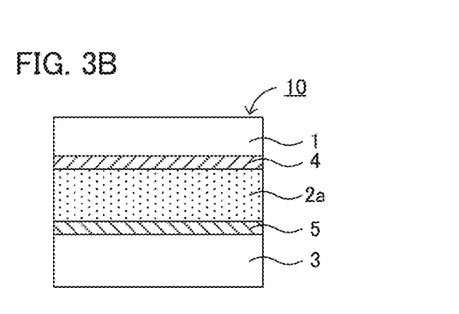

FIGS. 3A and 3B are schematic cross-sectional views exemplifying the fluoride ion battery in the present disclosure; FIG. 3A shows the state before charge, and FIG. 3B shows the state after charge. The basic structure of fluoride ion battery 10 in FIGS. 3A and 3B is the same as that of fluoride ion battery 10 in FIGS. 1A and 1B. Meanwhile, in fluoride ion battery 10 shown in FIG. 3A, solid electrolyte layer 2 comprises: on anode current collector 3 side surface, short circuit inhibiting part 2b containing the solid electrolyte including the second metal element; a Ce compound containing a Ce element, a S element, and a F element; and an electron conductive material.

Also, by charging fluoride ion battery 10 shown in FIG. 3A, as shown in FIG. 3B, fluoride ion battery 10 comprising cathode active material layer 4 containing a fluoride of a first metal element or a carbon element on anode current collector 3 side surface of electrode layer 1, and anode active material layer 5 containing a simple substance of the second metal element, a Ce compound, and an electron conductive material on anode current collector 3 side surface of solid electrolyte layer 2, can be obtained. Incidentally, in FIG. 3B, whole short circuit inhibiting part 2b becomes anode active material layer 5; however, when the charge level is small, just a part of short circuit inhibiting part 2b may become anode active material layer 5 in some cases. On the contrary, when the charge level is large, not only short circuit inhibiting part 2b, but also a part of solid electrolyte part 2a in anode current collector 3 side may become anode active material layer 5 in some cases.

According to the present disclosure, a specific short circuit inhibiting part is arranged so as to obtain a fluoride ion battery in which occurrence of short circuit is inhibited. Also, as described in Reference Example later, occurrence of short circuit may be inhibited by using a soft material such as a Pb foil for the anode current collector, for example. However, usage of a material such as a Pb foil shifts the charge and discharge potentials to noble side and the battery voltage tends to be small. To solve the problem, the arrangement of the short circuit inhibiting part containing the solid electrolyte including the second metal element, the Ce compound, and the electron conductive material, inhibits the charge and discharge potentials from being shifted to noble side. Thus, it is advantageous on the point of battery voltage.

The fluoride ion battery in the present disclosure will be hereinafter explained in each constitution.

1. Electrode Layer

The electrode layer in the present disclosure is a layer that includes a first metal element or a carbon element, and is capable of fluorination and defluorination. Usually, the fluorination of the first metal element or the carbon element occurs during charge, and defluorination thereof occurs during discharge. Since the nucleophilicity of fluoride ion is extremely high, it reacts with many elements to form a fluoride. Meanwhile, in the electrode layer, it is necessary that the defluorination reaction occurs during discharge. In other words, the electrode layer needs to be a layer in which not only the fluorination reaction but also the defluorination reaction can occur. Also, the electrode layer functions as both a cathode current collector (or an intermediate current collector) and a cathode active material layer.

Examples of the electrode layer may include a metal electrode layer including a first metal element, and a carbon electrode layer including a carbon element. Examples of the metal electrode layer may include a simple substance and an alloy including the first metal element. Examples of the first metal element may include at least one kind of Pb, Cu, Sn, In, Bi, Sb, Ni, Co, La, Ce, Mn, V, Fe, Cr, Nb, Ti, and Zn. When the metal electrode layer is an alloy, the alloy may include just one kind of the first metal element, and may include two kinds or more thereof. In the latter case, the metal element (metal element A) with the highest fluorination potential and defluorination potential among a plurality of the first metal elements is preferably the main component of the alloy. The proportion of metal element A in the alloy may be 50 mol % or more, may be 70 mol % or more, and may be 90 mol % or more. Also, examples of the carbon electrode layer may include graphite and graphene.

The thickness of the electrode layer before charge is, for example, 5 μm or more, and preferably 50 μm or more. If the thickness of the electrode layer before charge is too small, the thickness of the part where functions as a current collector during charge (a part not in reaction with fluoride ions) would be small and there is a possibility sufficient current collecting function may not be obtained. Incidentally, the electrode layer before charge refers to the electrode layer in which the cathode active material layer containing the fluoride of the first metal element or the carbon element is not present. Also, although the electrode layer functions as a cathode current collector, an auxiliary current collector with high chemical stability may be additionally arranged considering corrosion due to fluorination. Examples of the auxiliary current collector may include a current collector including a noble metal such as Au and Pt.

2. Solid Electrolyte Layer

The solid electrolyte layer in the present disclosure is a layer containing a solid electrolyte including a second metal element with lower fluorination potential and defluorination potential than those of the first metal element or of the carbon element. The second metal element is usually deposited as a simple substance of metal during charge, and defluorination thereof occurs during discharge.

Usually, the solid electrolyte is a material that contains the second metal element and a F element, and has fluoride ion conductivity. The fluorination potential and defluorination potential of the second metal element are lower than those of the first metal element or of the carbon element. In other words, when the electrode layer includes the first metal element, the fluorination potential and defluorination potential of the second metal element are lower than those of the first metal element. Similarly, when the electrode layer includes the carbon element, the fluorination potential and defluorination potential of the second metal element are lower than those of the carbon element. The fluorination potential and defluorination potential may be determined by, for example, cyclic voltammetry (CV). The difference of the fluorination potentials between the first metal element or the carbon element and the second metal element is, for example, 0.05 V or more, and preferably 0.1 V or more. Also, the difference of the defluorination potentials between the first metal element or the carbon element and the second metal element is, for example, 0.05 V or more, and preferably 0.1 V or more.

Examples of the second metal element may include at least one kind of La, Ba, Pb, Sn, Ca, and Ce. The solid electrolyte may include just one kind of the second metal element, and may include two or more kinds thereof. In the latter case, the metal element (metal element B) with the highest fluorination potential and defluorination potential among a plurality of the second metal element is preferably the main component of all the metal elements included in the solid electrolyte. The proportion of metal element B in all the metal elements included in the solid electrolyte may be, 50 mol % or more, may be 70 mol % or more, and may be 90 mol % or more.

Examples of the solid electrolyte may include at least one kind of $La_{1-x}Ba_xF_{3-x}$ ($0 \leq x \leq 2$), $Pb_{2-x}Sn_xF_4$ ($0 \leq x \leq 2$), $Ca_{2-x}Ba_xF_4$ ($0 \leq x \leq 2$), and $Ce_{1-x}Ba_xF_{3-x}$ ($0 \leq x \leq 2$). The x may be, respectively, larger than 0, may be 0.3 or more, may be 0.5 or more, and may be 0.9 or more. Also, the x may be, respectively, smaller than 1, may be 0.9 or less, may be 0.5 or less, and may be 0.3 or less. There are no particular limitations on the shape of the solid electrolyte, and examples thereof may include a granular shape.

As shown in FIG. 3A, for example, in fluoride ion battery 10 before charge, solid electrolyte layer 2 preferably includes, on anode current collector 3 side surface, short circuit inhibiting part 2b containing a solid electrolyte, a Ce compound containing a Ce element, a S element, and a F element, and an electron conductive material. Further, solid electrolyte layer 2 preferably includes solid electrolyte part 2a containing a solid electrolyte in electrode layer 1 side from short circuit inhibiting part 2b. Also, in fluoride ion battery 10, it is preferable that an anode active material layer is not present between solid electrolyte layer 2 and anode current collector 3.

The solid electrolyte (solid electrolyte including the second metal element) included in the short circuit inhibiting part is in the same contents as those described above. Also, the proportion of the solid electrolyte in the short circuit inhibiting part is, for example, 10 weight % or more, may be 30 weight % or more, and may be 50 weight % or more. If the proportion of the solid electrolyte is too little, there is a possibility that the ion conducting path in the short circuit inhibiting part may be insufficient. Meanwhile, the proportion of the solid electrolyte in the short circuit inhibiting part is, for example, 90 weight % or less, and may be 80 weight % or less. If the proportion of the solid electrolyte is too much, relatively, the proportion of the Ce compound and the electron conductive material becomes little, and there is a possibility that sufficient short circuit inhibiting effect may not be obtained.

The Ce compound is a compound containing a Ce element, a S element, and a F element. The Ce compound preferably has the composition represented by, for example, $CeS_xF_{2-x}$, ($0<x<2$), in which x is, for example, 0.1 or more, may be 0.5 or more, may be 0.7 or more, and may be 0.9 or more. Meanwhile, x is, for example, 1.9 or less, may be 1.5 or less, may be 1.3 or less, and may be 1.1 or less.

The Ce compound preferably has a peak at the position of at least one of $2\theta=25.4°±0.5°$, $31.2°±0.5°$, $41.0°±0.5°$, $45.0°±0.5°$, $52.6°±0.5°$, $65.9°±0.5°$, and $71.9°±0.5°$, in an X-ray diffraction measurement using a CuKα ray. Incidentally, the range of these peak positions may be ±0.3°, and may be ±0.1°. Also, the crystal phase having the peak may be referred to as CeSF crystal phase in some cases. The Ce compound preferably contains the CeSF crystal phase as a main phase. The proportion of the CeSF crystal phase to all the crystal phases included in the Ce compound is, for example, 50 weight % or more, may be 70 weight % or more, and may be 90 weight % or more.

Also, the proportion of the Ce compound in the short circuit inhibiting part is, for example, 10 weight % or more, and may be 20 weight % or more. If the proportion of the Ce compound is too little, there is a possibility that sufficient short circuit inhibiting effect may not be obtained. Meanwhile, the proportion of the Ce compound in the short circuit inhibiting part is, for example, 50 weight % or less, and may be 40 weight % or less. If the proportion of the Ce compound is too much, relatively, the proportion of the solid electrolyte and the electron conductive material becomes little, and there is a possibility that the ion conducting path and the electron conducting path in the short circuit inhibiting part may be insufficient.

Examples of the electron conductive material may include a carbon material and a metal material, but the carbon material is preferable. Examples of the carbon material may include carbon black such as acetylene black, Ketjen black, furnace black, and thermal black; graphene, fullerene, and carbon nanotube. The proportion of the electron conductive material in the short circuit inhibiting part is, for example, 0.1 weight % or more, and may be 1 weight % or more. If the proportion of the electron conductive material is too little, there is a possibility that the electron conducting path in the short circuit inhibiting part may be insufficient. Meanwhile, the proportion of the electron conductive material in the short circuit inhibiting part is, for example, 20 weight % or less, and may be 15 weight % or less. If the proportion of the electron conductive material is too much, relatively, the proportion of the solid electrolyte and the Ce compound becomes little, and there is a possibility that sufficient short circuit inhibiting effect may not be obtained.

The thickness of the short circuit inhibiting part is, for example, 5 μm or more, and may be 10 μm or more. If the thickness of the short circuit inhibiting part is too small, there is a possibility that sufficient short circuit inhibiting effect may not be obtained. Meanwhile, the thickness of the short circuit inhibiting part is, for example, 200 μm or less, and may be 100 μm or less. If the thickness of the short circuit inhibiting part is too large, the thickness of the solid electrolyte layer overall becomes large, and there is a possibility that the energy density of the battery may be degraded.

Also, as described above, when the solid electrolyte layer includes the short circuit inhibiting part, the solid electrolyte layer usually includes a solid electrolyte part in the electrolyte layer side from the short circuit inhibiting part. The solid electrolyte part is a layer that exhibits a main function of the solid electrolyte layer, and contains at least a solid electrolyte (the solid electrolyte including the second metal element). Meanwhile, due to the function, the solid electrolyte part does not contain an electron conductive material. The proportion of the solid electrolyte in the solid electrolyte part is, for example, 70 weight % or more, may be 90 weight % or more, and may be 100 weight %.

The thickness of the solid electrolyte part may be larger than the thickness of the short circuit inhibiting part. In that case, the thickness of the solid electrolyte part is, compared to the thickness of the short circuit inhibiting part, for example, two times thereof or more, may be 5 times thereof or more, and may be 10 times thereof or more. Meanwhile, the thickness of the solid electrolyte part may be smaller than the thickness of the short circuit inhibiting part. In that case, the thickness of the solid electrolyte part is, compared to the thickness of the short circuit inhibiting part, for example, 0.6 times or less thereof, may be 0.5 times or less thereof, may be 0.4 times or less thereof, and may be 0.3 times or less thereof. Also, the thickness of the solid electrolyte part is, for example, 10 μm or more, and may be 20 μm or more. Meanwhile, the thickness of the solid electrolyte part is, for example, 1000 μm or less, and may be 800 μm or less.

Also, as shown in FIG. 3B, for example, fluoride ion battery 10 after charge preferably includes cathode active material layer 4 containing the fluoride of the first metal element or the carbon element, on anode current collector 3 side surface of electrode layer 1, and in addition, preferably includes anode active material layer 5 containing a simple substance of the second metal element, a Ce compound, and an electron conductive material, on anode current collector 3 side surface of solid electrolyte layer 2. A part of the solid electrolyte layer (short circuit inhibiting part, in particular) becomes an anode active material layer in a self-forming reaction during charge.

The cathode active material layer (fluoride layer) is a layer containing the fluoride of the first metal element or the carbon element included in the electrode layer, and corresponding to a cathode active material layer in a charged state. There are no particular limitations on the thickness of the cathode active material layer since it varies with the state of charge. Also, the electrode layer in complete discharged state (such as electrode layer 1 in FIG. 3A) preferably has uniform composition. Meanwhile, in the electrode layer in charged state, it is preferable that the current collector part not in fluorination reaction (such as electrode layer 1 in FIG. 3B) and the active material part in fluorination reaction (such as cathode active material layer 4 in FIG. 3B) have atomic continuity. The presence of the atomic continuity may be confirmed by, for example, observing the interface by a transmission electron microscope.

The anode active material layer is a layer containing a simple substance of the second metal element, a Ce compound, and an electron conductive material, and is usually generated in a self-forming manner from the solid electrolyte layer. There are no particular limitations on the thickness of the anode active material layer since it varies with the state of charge. Also, the anode active material layer (such as anode active material layer 5 in FIG. 3B) preferably contains a residue component of the solid electrolyte in addition to the simple substance of the second metal element. The residue component refers to a component including elements other than the second metal element deposited as a simple substance of metal among the elements configured in the solid electrolyte. For example, in Examples described later, during charge, a reaction occurs as follows: $La_{0.9}Ba_{0.1}F_{2.9}+2.7\ e^- \rightarrow 0.9\ La+0.1\ BaF_2+2.7\ F^-$. In this case, La corresponds to the simple substance of the second metal element, and $BaF_2$ corresponds to the residue component. The residue component is preferably a metal fluoride.

3. Anode Current Collector

The anode current collector in the present disclosure collects currents of the anode active material. Examples of the anode current collector may include a metal current collector including a metal element, and a carbon current collector including a carbon element. Examples of the metal current collector may include a simple substance and an alloy. Examples of the metal element to be used in the metal current collector may include Au, Ag, Pt, Pd, Ph, Ir, Ru, Os, Pb, Sn, In, Bi, and Sb. On the other hand, examples of the carbon current collector may include graphite and graphene.

Also, the anode current collector may be the same member as the electrode layer. In this case, the functions of five members: a cathode current collector, a cathode active material layer, a solid electrolyte layer, an anode active material layer, and an anode current collector, may be obtained with just the two members: the electrode layer (anode current collector) and the solid electrolyte layer. As the result, the cost reduction of a battery may be achieved.

Examples of the shape of the anode current collector may include a foil shape. The thickness of the anode current collector is, for example, 5 μm or more, and may be 10 μm or more. Meanwhile, the thickness of the anode current collector is, for example, 100 μm or less, and may be 50 μm or less. If the thickness of the anode current collector is too small, there is a possibility that the occurrence of short circuit may not be efficiently inhibited; if the thickness of the anode current collector is too large, there is a possibility that the high energy densification of a battery may not be easily achieved. Also, an auxiliary current collector with high chemical stability may be additionally arranged to the anode current collector considering the corrosion due to fluorination. Examples of the auxiliary current collector may include a current collector including a noble metal such as Au and Pt.

4. Fluoride Ion Battery

The fluoride ion battery in the present disclosure may have a monopolar structure including a single electrode layer and solid electrolyte layer, and may have a bipolar structure in which a plurality of the electrode layer and the solid electrolyte layer are alternatively disposed. In the latter case, increase in the battery voltage may be achieved.

The fluoride ion battery in the present disclosure is usually a secondary battery so as to be repeatedly charged and discharged and useful as a car-mounted battery, for example. Incidentally, the secondary battery includes the usage of the secondary battery as a primary battery (usage for the purpose of discharge just once after charge). Also, examples of the shape of the fluoride ion battery may include a coin shape, a laminate shape, a cylindrical shape, and a square shape. Also, there are no particular limitations on a battery case to be used for the fluoride ion battery.

Figure 4A:
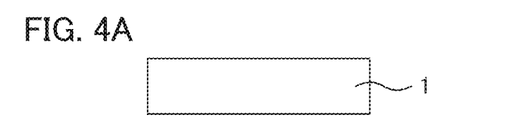
FIGS. 4A to 4E are schematic cross-sectional views exemplifying the method for producing the fluoride ion battery in the present disclosure.
Figure 4B:
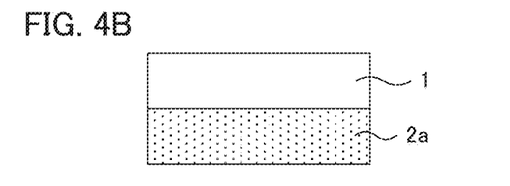
Figure 4C:
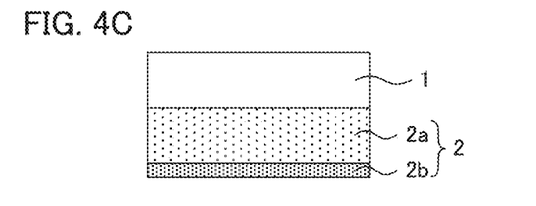

There are no particular limitations on the method for producing the fluoride ion battery in the present disclosure. FIGS. 4A to 4E are schematic cross-sectional views exemplifying the method for producing the fluoride ion battery in the present disclosure. In FIGS. 4A to 4E, first, electrode layer 1 that includes the first metal element or the carbon element and is capable of fluorination and defluorination, is prepared (FIG. 4A). Next, on one surface of electrode layer 1, the solid electrolyte including the second metal element with lower fluorination potential and defluorination potential than those of the first metal element or the carbon element, is disposed and pressed to form solid electrolyte part 2a (FIG. 4B). Next, on the surface of solid electrolyte part 2a which is the opposite surface to electrode layer 1, a mixture containing the solid electrolyte including the second metal element, a Ce compound, and an electron conductive material, is disposed and pressed to form short circuit inhibiting part 2b (FIG. 4C). Thereby, solid electrolyte layer 2 including solid electrolyte part 2a and short circuit inhibiting part 2b is obtained. Incidentally, solid electrolyte part 2a and short circuit inhibiting part 2b may be formed at the same time.

Figure 4D:
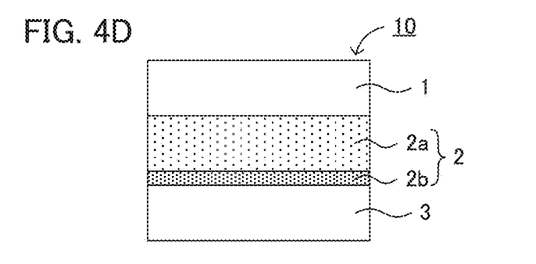
Figure 4E:
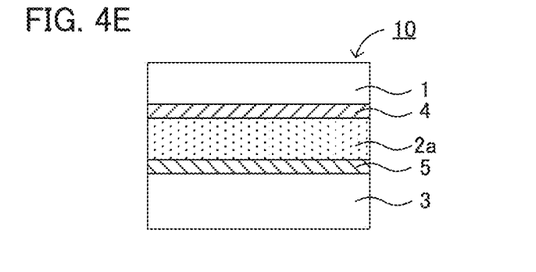

Next, on the surface of solid electrolyte layer 2 which is opposite to electrode layer 1, anode current collector 3 is disposed and pressed (FIG. 4D). In this manner, fluoride ion battery 10 before charge is obtained by forming a layered body including electrode layer 1, solid electrolyte layer 2, and anode current collector 3, in this order. In addition, the obtained layered body (fluoride ion battery 10 before charge) may be charged to form cathode active material layer 4 containing the fluoride of the first metal element or the carbon element, on anode current collector 3 side surface of electrode layer 1, and form anode active material layer 5 containing the simple substance of the second metal element, a Ce compound, and an electron conductive material (FIG. 4E). Thereby, fluoride ion battery 10 after charge is obtained.

Incidentally, the present disclosure is not limited to the embodiments. The embodiments are exemplification, and any other variations are intended to be included in the technical scope of the present disclosure if they have substantially the same constitution as the technical idea described in the claim of the present disclosure and offer similar operation and effect thereto.

EXAMPLES

Example 1

Fabrication of Solid Electrolyte $LaF_3$ and $BaF_2$ were weighed so as to be $LaF_3:BaF_2=9:1$ in the molar ratio, and crushed and mixed by ball milling in the conditions of at 600 rpm and for 12 hours. After that, the obtained mixture was heat treated in the conditions of, in an Ar atmosphere at 600° C. for 10 hours, and thereby $La_{0.9}Ba_{0.1}F_{2.9}$ was obtained.

Figure 5:
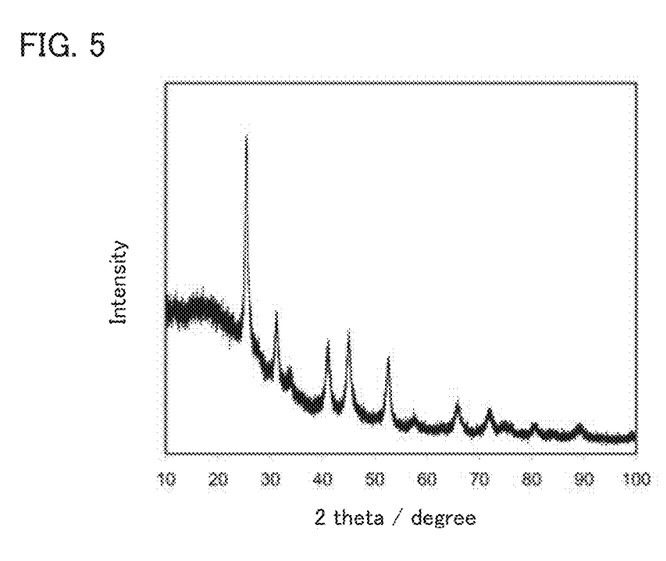
FIG. 5 is the result of an XRD measurement for CeSF fabricated in Example 1.

Fabrication of CeSF $CeF_3$ and $Ce_2S_3$ were weighed so as to be $CeF_3:Ce_2S_3=1:1$ in the molar ratio, and crushed and mixed by ball milling in the conditions of at 600 rpm and for 3 hours. Thereby CeSF was obtained. An X-ray diffraction measurement (XRD measurement) was conducted for the obtained CeSF. Incidentally, CuKα ray was used as the source of radiation. The result is shown in FIG. 5. As shown in FIG.

5, in CeSF, typical peaks were confirmed in the vicinity of, 2 θ=25.4°, 31.2°, 41.0°, 45.0°, 52.6°, 65.9°, and 71.9°.

Fabrication of Evaluation Cell

In a globe box, 100 mg of $La_{0.9}Ba_{0.1}F_{2.9}$ powder was weighed and used as material A for the solid electrolyte part. Also, $La_{0.9}Ba_{0.1}F_{2.9}$ powder, CeSF powder, and carbon powder (electron conductive material) were weighed so as to be $La_{0.9}Ba_{0.1}F_{2.9}$ powder:CeSF powder:carbon powder=6:3:1 in the weight ratio. The obtained mixture of 10 mg was used as material B for short circuit inhibiting part. Material A and material B were layered and pressurized-powder-molded to obtain pellet. The obtained pellet was sandwiched with an electrode layer (Pb foil) and an anode current collector (Pt foil) and pressurized-powder-molded to obtain an evaluation cell.

Comparative Example 1

An evaluation cell was obtained in the same manner as in Example 1 except that $La_{0.9}Ba_{0.1}F_{2.9}$ powder was used instead of material B.

Comparative Example 2

$La_{0.9}Ba_{0.1}F_{2.9}$ powder and carbon powder (electron conductive material) were weighed so as to be $La_{0.9}Ba_{0.1}F_{2.9}$ powder:carbon powder=8:2 in the weight ratio, and mixed. An evaluation cell was obtained in the same manner as in Example 1 except that the obtained mixture was used instead of material B.

Comparative Example 3

CeSF powder and carbon powder (electron conductive material) were weighed so as to be CeSF powder:carbon powder=8:2 in the weight ratio, and mixed. An evaluation cell was obtained in the same manner as in Example 1 except that the obtained mixture was used instead of material B.

Comparative Example 4

$La_{0.9}Ba_{0.1}F_{2.9}$ powder and CeSF powder were weighed so as to be $La_{0.9}Ba_{0.1}F_{2.9}$ powder:CeSF powder=2:1 in the weight ratio, and mixed. An evaluation cell was obtained in the same manner as in Example 1 except that the obtained mixture was used instead of material B.

[Evaluation]

A charge and discharge test was conducted for evaluation cells obtained in Example 1 and Comparative Examples 1 to 4. The charge and discharge test was conducted in the conditions of, under an environment at 140° C. with the current value of 0.1 mA/cm² and voltage from −2.6 V to 0 V. Incidentally, a work electrode was anode side (anode current collector side), and a counter electrode and a reference electrode were cathode side (electrode layer side). The results are shown in FIG. 6 to FIG. 10.

Figure 6:
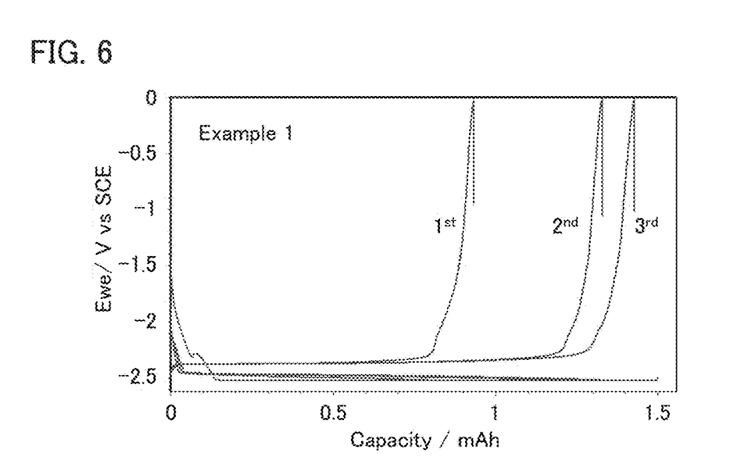
FIG. 6 is the result of a charge and discharge test for the evaluation cell obtained in Example 1.

As shown in FIG. 6, short circuit did not occur in Example 1, and it was confirmed that charge and discharge were possible. Also, in Example 1, charge and discharge efficiency improved as the cycle increased; extremely high reversibility was obtained in the third cycle.

Figure 7:
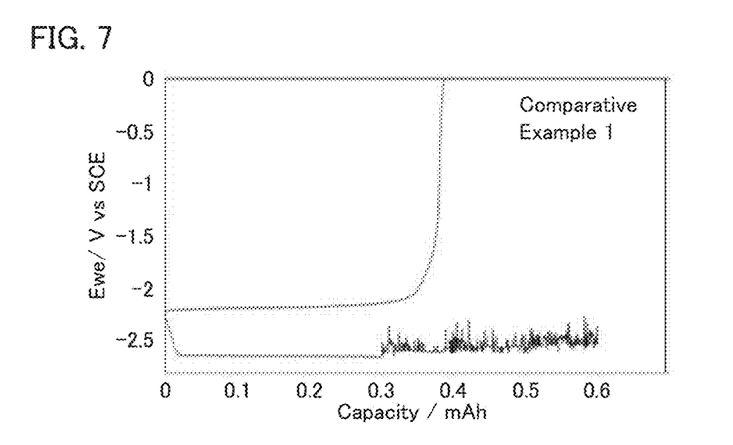
FIG. 7 is the result of a charge and discharge test for the evaluation cell obtained in Comparative Example 1.
Figure 8:
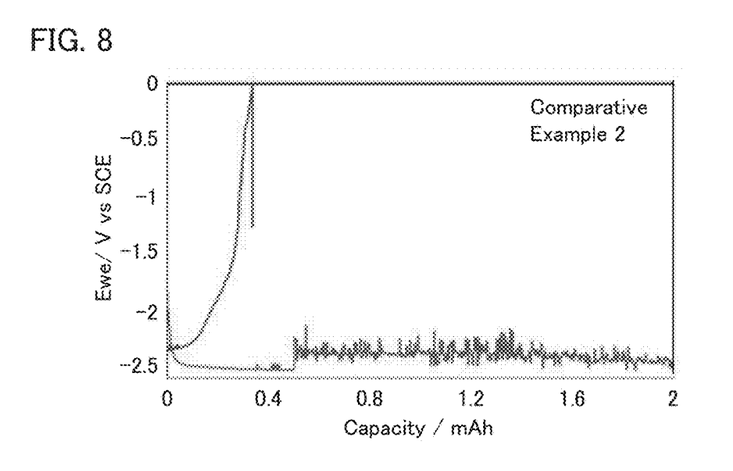
FIG. 8 is the result of a charge and discharge test for the evaluation cell obtained in Comparative Example 2.

On the other hand, as shown in FIG. 7, in Comparative Example 1, the voltage started to be disordered when the charge reached to 0.3 mAh, and the occurrence of minute short circuit was confirmed. In other words, it was confirmed that short circuit easily occurred when the short circuit inhibiting part was not arranged. Also, as shown in FIG. 8, in Comparative Example 2, the voltage started to be disordered when the charge reached to 0.5 mAh, and the occurrence of minute short circuit was confirmed. In other words, it was confirmed that sufficient short circuit inhibiting effect was not obtained with the short circuit inhibiting part not including CeSF powder.

Figure 9:
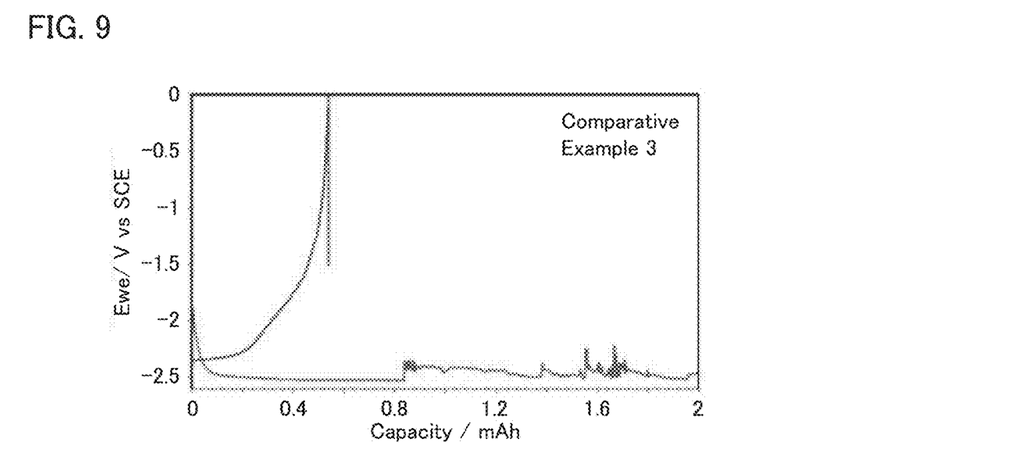
FIG. 9 is the result of a charge and discharge test for the evaluation cell obtained in Comparative Example 3.
Figure 10:
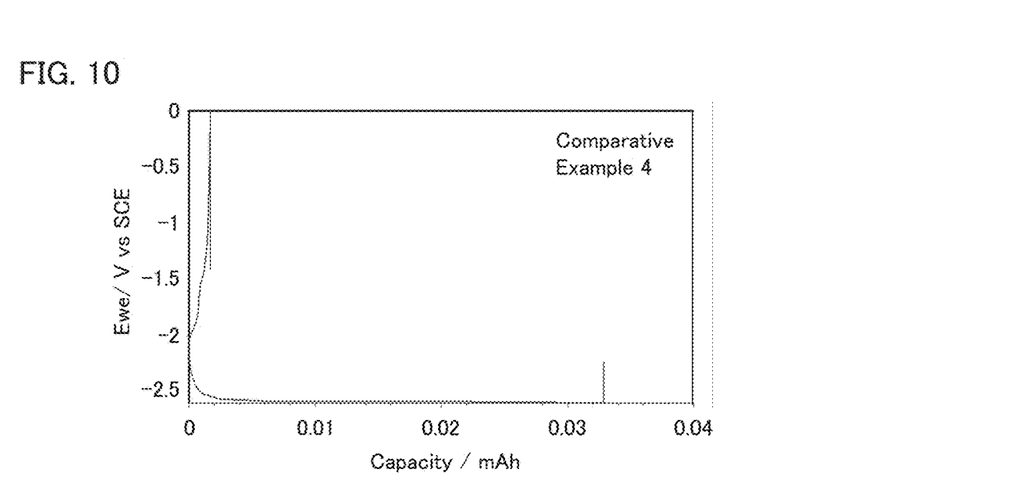
FIG. 10 is the result of a charge and discharge test for the evaluation cell obtained in Comparative Example 4.

Also, as shown in FIG. 9, in Comparative Example 3, the voltage started to be disordered when the charge reached to 0.8 mAh, and the occurrence of minute short circuit was confirmed. In other words, it was confirmed that sufficient short circuit inhibiting effect was not obtained with the short circuit inhibiting part not including $La_{0.9}Ba_{0.1}F_{2.9}$ powder. Incidentally, as shown in FIG. 10, in Comparative Example 4, charge reaction stopped at the initial stage of charge. That was because the battery resistance with short circuit inhibiting part not having carbon powder was high and resulted in reaching to the cut-off voltage at the initial stage of charge.

From these results, it was confirmed that the occurrence of short circuit was effectively inhibited since the solid electrolyte layer included the short circuit inhibiting part containing a solid electrolyte, a Ce compound, and an electron conductive material, on the anode current collector side surface.

Reference Example 1

An evaluation cell (Pb/$La_{0.9}Ba_{0.1}F_{2.9}$/Pb) was obtained in the same manner as in Comparative Example 1 except that a Pb foil was used as the anode current collector. A charge and discharge test was conducted for the evaluation cell obtained in Reference Example 1. The charge and discharge test was conducted in the conditions of, under the environment of 140° C. with the current value of 50 μA/cm² and voltage from −2.6 V to 0 V. Incidentally, a work electrode was anode side (anode current collector side), and a counter electrode and a reference electrode were cathode side (electrode layer side). The result is shown in FIG. 11.

Figure 11:
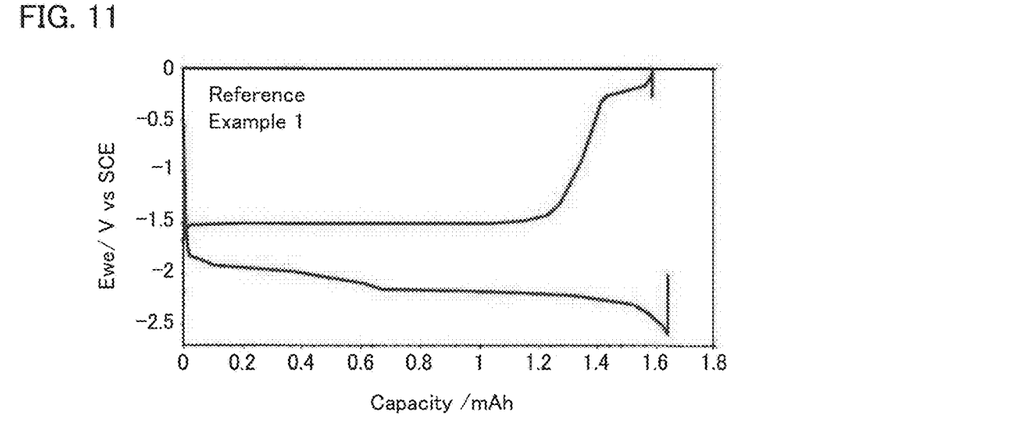
FIG. 11 is the result of a charge and discharge test for the evaluation cell obtained in Reference Example 1.

As shown in FIG. 11, short circuit did not occur in Reference Example 1. It is presumed that the usage of a soft material such as a Pb foil for the anode current collector facilitated uniform defluorination reaction to inhibit the occurrence of short circuit. Meanwhile, in comparison of Reference Example 1 to Example 1, the charge and discharge potentials shifted to noble side in Reference Example 1, and it was suggested that the battery voltage was likely to decrease. On the other hand, the charge and discharge potentials of Example 1 were lower than those of Reference Example 1, and the advantage on the point of battery voltage was confirmed.

REFERENCE SIGNS LIST 1 electrode layer
2 solid electrolyte layer
2a solid electrolyte part
2b short circuit inhibiting part
3 anode current collector
4 cathode active material layer
5 anode active material layer
10 fluoride ion battery

What is claimed is:
1. A fluoride ion battery comprising:
an electrode layer, a solid electrolyte layer, and an anode current collector disposed in this order, wherein the electrode layer includes a first metal element or a carbon element and is capable of fluorination and defluorination;

the solid electrolyte layer contains a solid electrolyte including a second metal element with lower fluorination potential and defluorination potential than those of the first metal element or of the carbon element;

a cathode active material layer containing a fluoride of the first metal element or the carbon element is present on the anode current collector side surface of the electrode layer between the electrode layer and the solid electrolyte layer;

an anode active material layer containing: a Ce compound containing a simple substance of the second metal element, a Ce element, a S element and a F element; and an electron conductive material, is present on the anode current collector side surface of the solid electrolyte layer between the solid electrolyte layer and the anode current collector, wherein the cathode active material layer and the anode active material layer are generated via a self-forming reaction of the solid electrolyte layer, wherein the self-forming reaction of the solid electrolyte layer occurs during charging of the fluoride ion battery.

2. The fluoride ion battery according to claim 1, wherein the first metal element is at least one selected from the group consisting of Pb, Cu, Sn, In, Bi, Sb, Ni, Co, La, Ce, Mn, V, Fe, Cr, Nb, Ti, and Zn.

3. The fluoride ion battery according to claim 1, wherein the second metal element is at least one selected from the group consisting of La, Ba, Pb, Sn, Ca, and Ce.

4. The fluoride ion battery according to claim 1, wherein the solid electrolyte is at least one selected from the group consisting of $La_{1-x}Ba_xF_{3-x}$, $Pb_{2-x}Sn_xF_4$, $Ca_{2-x}Ba_xF_4$, and $Ce_{1-x}Ba_xF_{3-x}$ where $0 \leq x \leq 2$.

* * * * *